Patented July 11, 1933

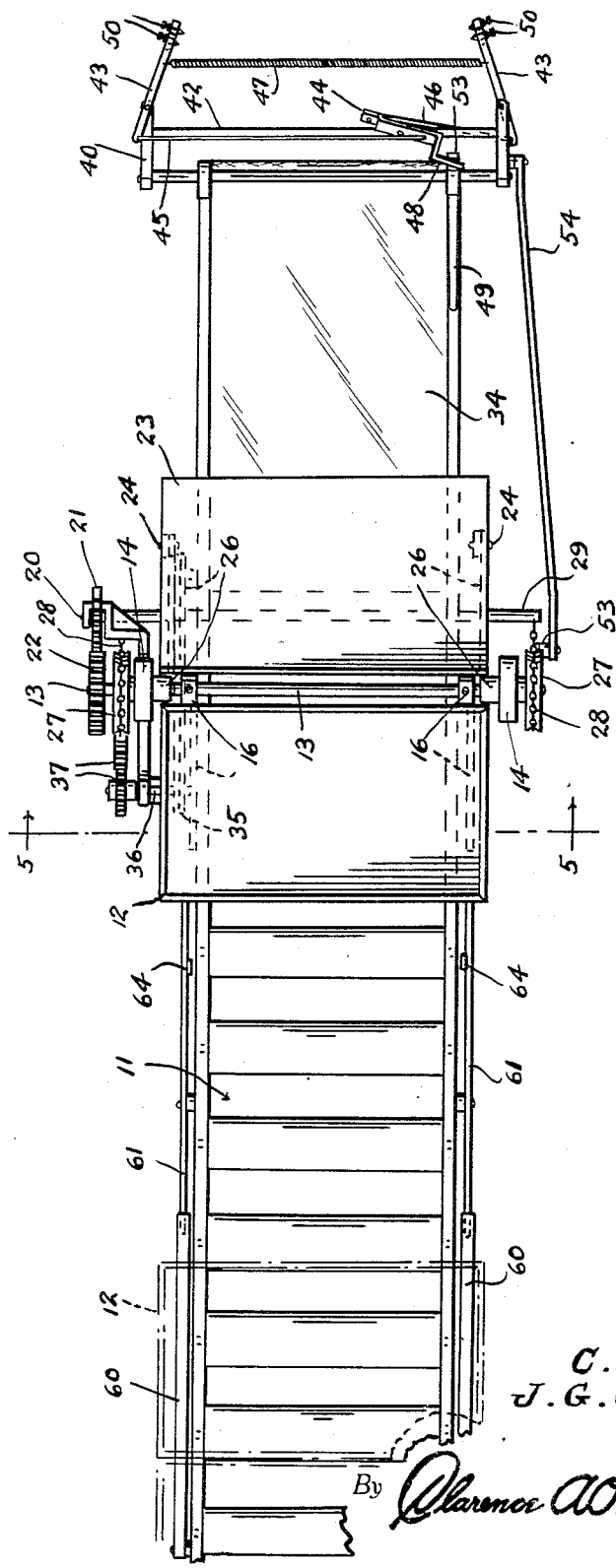

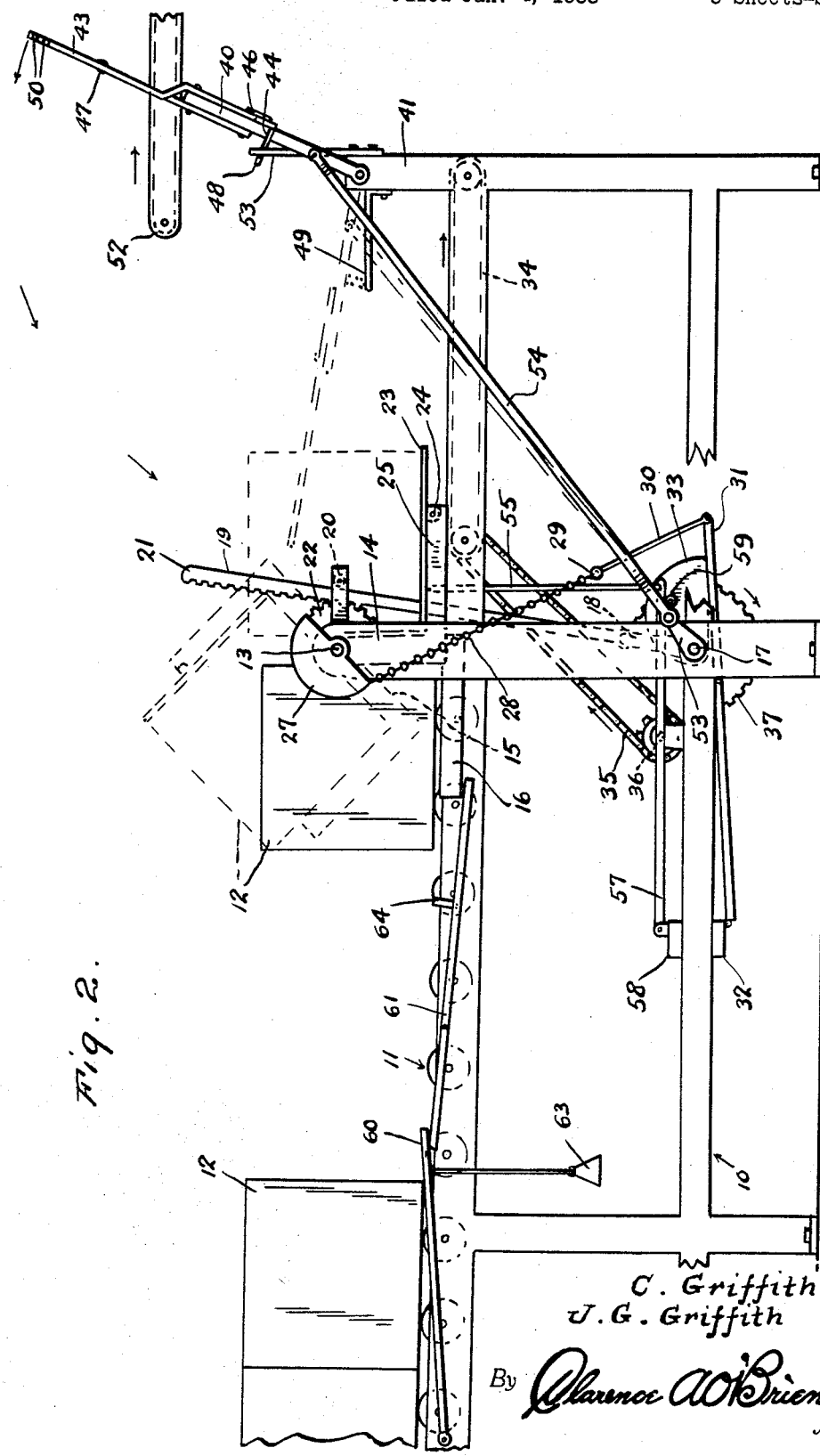

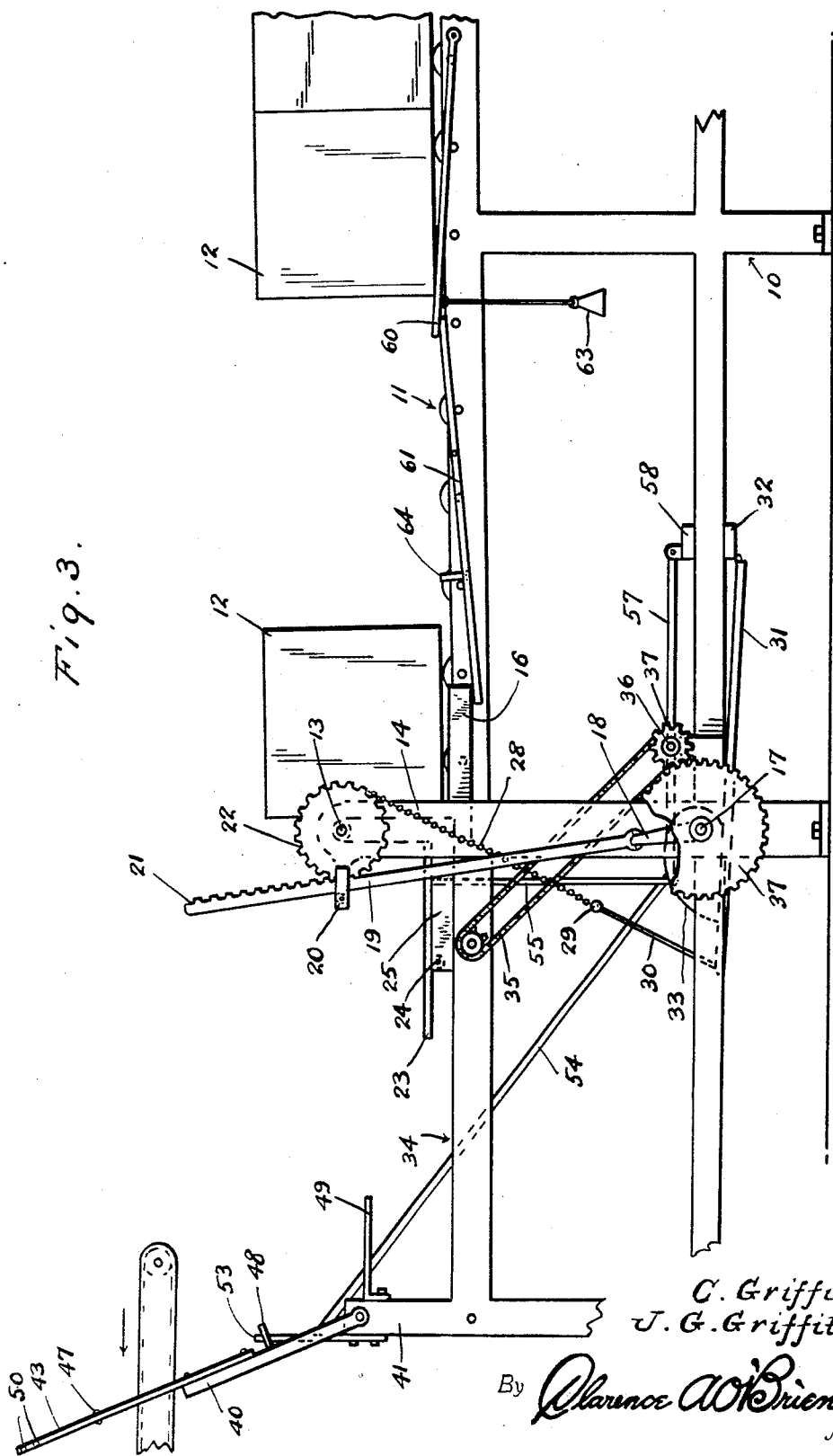

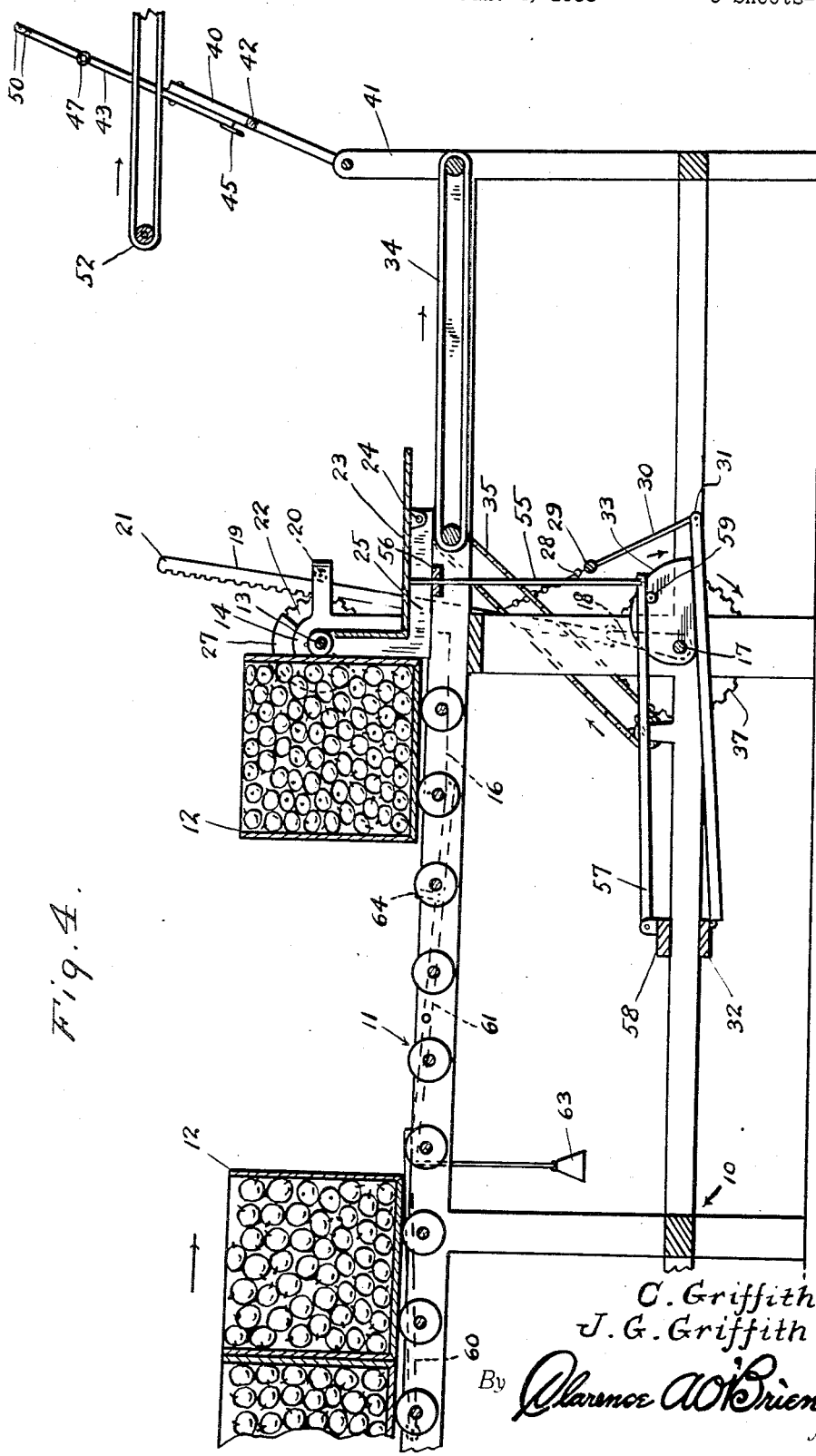

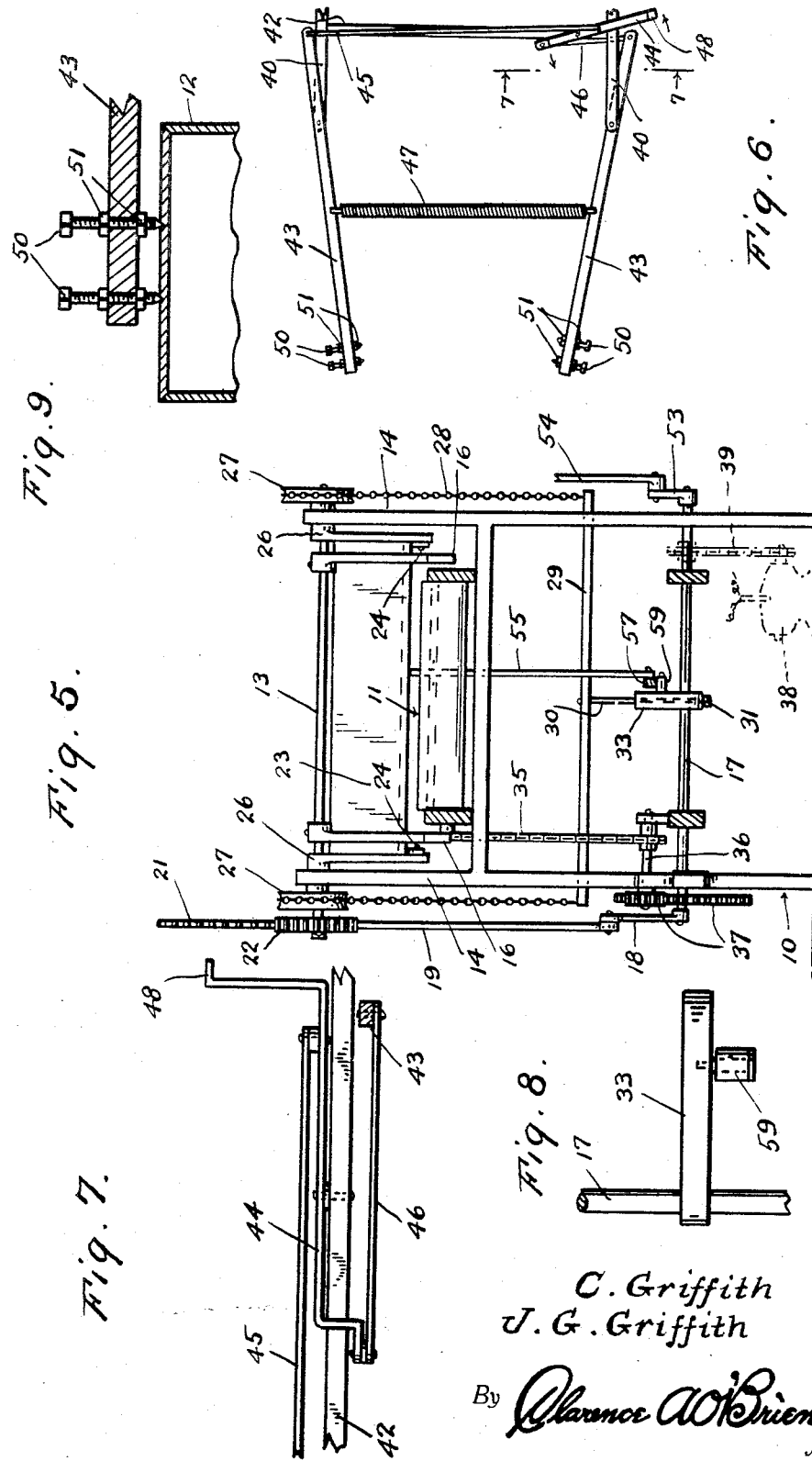

1,917,709

UNITED STATES PATENT OFFICE

CLIFFORD GRIFFITH AND J. GILBERT GRIFFITH, OF ENTIAT, WASHINGTON

FRUIT DUMPER

Application filed January 4, 1923. Serial No. 650,172.

This invention relates to a device for emptying boxes of fruit, which fruit are to be subsequently graded or sorted.

In accordance with the present invention means is provided for inverting the filled boxes of fruit, together with conveyor means for conveying the fruit to the grading device, together with additional conveyor means for carrying the empty boxes to a point remote from the dumping device.

The invention together with its numerous objects and advantages will be best understood from a study of the following description, taken in connection with the accompanying drawings wherein:

Figure 1 is a top plan view of the device.

Figure 2 is an elevational view of one side of the device.

Figure 3 is an elevational view of an opposite side of the device.

Figure 4 is a vertical sectional elevational view through the device.

Figure 5 is a sectional view taken substantially on the line 5—5 of Figure 1 and looking in the direction of the arrows.

Figure 6 is a plan view of a box lifting device.

Figure 7 is a sectional view taken substantially on the line 7—7 of Figure 6.

Figure 8 is a plan view of a shaft and a cam associated therewith, and

Figure 9 is a fragmentary sectional view showing the manner in which the box to be lifted is engaged by the lifting device shown in Figure 6.

Referring to the drawings by reference numerals it will be seen that 10 designates generally a table of suitable frame construction and provided in the top thereof with a roller conveyor designated generally by the reference character 11 and along which the boxes 12 of fruit are caused to travel toward a device for inverting the boxes 12.

The device just mentioned for inverting the boxes 12 comprises a shaft 13 that is rotatably supported between a pair of uprights 14. Substantially L-shaped arms 15 are secured at one end to the shaft 13 for rocking movement with the shaft, and have free ends 16 normally arranged in the full line position shown in Figure 2 to engage beneath the bottom of a box 12 as shown in said figure.

Suitably journalled transversely in the table 10 is a shaft 17 provided on one end with a crank arm 18 to which is pivoted a bar 19 arranged to slide through a suitable guide 20 provided adjacent the upper end of one of the standards 14. At its upper end the rod 19 is provided with a rack 21 engageable with a gear wheel 22 provided on the adjacent end of the shaft 13, and obviously through the medium of the rack 21 engaging the gear 22, the motion of the shaft 17 is transmitted to the shaft 13 for swinging the arm 15 upwardly to invert the box 12 in the manner suggested in Figure 2.

As will be noted from a study of Figure 4 the filled boxes 12 have their lids removed before the boxes are fed to the box dumping or inverting device just described. To close the box as the same is being inverted there is provided a lid member 23 that is pivoted as at 24 to the free ends of a pair of L-shaped arms 25, and these arms 25 are provided with bearings 26 engaged with the shaft 13 for supporting the arms 25 in a manner to rotate relative to the shaft. On the ends of the bearing 26 are fixed pulleys 27 over which are trained chains or similar flexible elements 28. Chains 28 at one end are fixed to the pulleys 27 and at their free ends are connected together by a cross rod 29. Rod 29 intermediate its end is integral with one end of a link 30. At its free end link 30 is pivoted to one end of a lever 31 that in turn is pivoted to a lower cross bar 32. The lever 31 is arranged in the path of a cam 33 that is fixed to the shaft 17 and rotates with the shaft. Thus it will be seen that as shaft 17 rotates in a clockwise direction, or in the direction indicated by the arrows in Figure 4, the cam will cause the lever 31 to swing downwardly thus exerting a pull on the chains 28 causing the arms 25 to swing upwardly and in an anti-clockwise direction at about the same time that the arms 16 are swinging upwardly in a clockwise direction so that when the box 12 is in the tilted position suggested in Figure 2 the lid 23 will engage the open top of the box as shown in said figure.

As the arms 16 continue with the shaft 13 to complete its revolution the arms 25 carrying the lid 23 will move in the same direction with the arms 16, arms 25, and lid 23 returning to the full line position shown in Figure 2 and supporting thereon the box 12 in the inverted position suggested by dotted line in said figure.

With the box in the inverted dotted line position shown in Figure 2 means is provided for lifting the box so that the contents thereof will discharge from the box and on to an endless conveyor 34 that is suitably mounted in the top of the table 10 and is driven through the medium of a chain and sprocket mechanism 35 from a suitably mounted stub shaft 36 that is in turn driven from the shaft 17 through the medium of gearing 37. In the present instance shaft 17 is driven from an electric motor 38 that has a chain and sprocket drive connection with the shaft 17 as at 39.

The aforementioned means for raising the inverted box 12 comprises a pair of arms 40 pivoted to standards 41 rising from the table at that end of the conveyor 34 remote from the box inverting device aforementioned. The arms 40 are connected by a cross bar 42. Pivoted to the free ends of the arms 40 are fingers 43 while pivoted to the cross bar 42 adjacent one end of the latter is a lever 44. Lever 44 at one side of its pivot is operatively connected with that finger 43 farthest remote from the pivot of the lever through the medium of a link 45. A relatively short link 46 connects the lever 44 at a relatively opposite side of its pivot with the approximate end of the other finger 43 as shown in Figures 6 and 7. The fingers 43 intermediate their ends are connected by a coil spring 47. Normally the parts just described are in the position suggested in Figure 6.

The lever 44 at its free end is formed to provide a stop 48 that is engageable with a lower trip 49 provided on one of the standards 41 to swing the lever past center and thereby spread the fingers 43 apart against the action of spring 47 so as to receive between the fingers the box 12 in the manner suggested in Figure 2.

To secure the box between the fingers 43, said fingers at their free ends are provided with pairs of screws 50 that are secured at the desired adjustment through the medium of lock nuts 51; and are provided at their free ends with points to penetrate the sides of the box as suggested in Figure 9. Obviously, as the fingers 43 together with the arms 40 move upwardly carrying the box 12, the contents of the box will discharge therefrom.

The box carrying device just described is arranged in operative position to one end of a conveyor 52 that is disposed above the conveyor 34 and which is adapted to receive the empty box for conveying the latter to a remote location, to be again filled, or for any other purpose. As the fingers 43 reach the limit of their upward swinging movement, the stop 48 on the lever 44 engages an upper trip 53 rising vertically from a standard 41, and the lever is thereby pushed passed center again swinging the fingers 42 outwardly away from one another against the action of the spring 47 to release the box, thus permitting the empty box to be moved along by the conveyor 52.

For swinging the arms 42 and associated parts, there is provided on the shaft 17 a crank arm 53 that is operatively connected with one of the arms 40 through the medium of a link 54.

To direct the fruit on to the conveyor 34 means is provided for tilting the lid 23 subsequent to a removal of the inverted box 12.

The tilting means for the lid 23 comprises a plunger 55 that is vertically shiftable through a guide 56 and at its upper end engages the under side of the lid 23 in the manner suggested in Figure 4. At its lower end the plunger 55 is pivotally connected to one end of a lever 57 that is pivoted to an upper cross bar 58. Lever 57 is arranged in the path of a lateral roller 59 provided on the cam 33 and thus, as the cam 33 rotates the lever 57 will be caused to swing up and down for reciprocating the plunger 55 and thereby tilt the member 23 when the arms 26 carrying said member are in the position shown in Figure 4 and subsequent to a removal of the inverted box.

To control the feeding of the boxes 12 to the box inverting device there is provided at relatively opposite sides of the roller conveyor 11, a pair of skids 60 pivoted at one end to the sides of the table 10, and at their free ends, the skids are engaged with one end of levers 61 that are also pivoted intermediate their ends to the sides of the table 10. At their other ends the levers 61 are arranged in the path of the ends 16 of the arms 15 shown in Figure 2. Provided on the free ends of the skids 60 are weights 62, while the levers 61 are connected by a transversely disposed stop member 64.

It will thus be seen that normally when the arms 15 are in the full line position shown in Figure 2, levers 61 have the ends thereof engaged with the ends 16 of arms 15 depressed, and their free ends raised for raising the free ends of the skids 60, so that the skids are engaged with the forwardmost box 12 and serve as a brake to prevent further progress of the boxes. As the arms 15 swing upwardly to the dotted line position shown in Figure 2 weights 63 will cause the skids 60 to swing downwardly for depressing the ends of the levers 61 engaged with said free ends of the skids 60. The forwardmost box 12 may then be moved forwardly into engagement with the stop 64 and thus be in a position to be placed above the ends 16 of the arms 15 upon return of the arm 15 to their normal position. Obviously as the arms 15 return to their normal position they will engage the levers 61 causing the latter to swing to the position shown in Figure 2 lowering the stop 64 whereby the said box 12 previously engaged with the stop may be moved along the conveyor 11 and into the full line position shown in Figure 2 above the ends 16 of arms 15.

Manifestly with the filled box thus in operative position with respect to the arms 15, upon upward swinging movement of the arms, the box will swing upwardly and the lid 23 will be applied to the top of the box in the manner hereinbefore mentioned, and the box subsequently inverted. Next the box will be raised from off the lid 23 and placed on to the conveyor 52 as also hereinbefore fully described, and the fruit discharged from the box will, upon a tilting of the lid 23 pass onto the conveyor 34 and from the conveyor 34 be conveyed (in the direction of the arrow shown in Figure 4 directly above the conveyor 34) to one end of the table, and from the conveyor 34 be directed in any suitable manner to a grading or sorting device or the like.

Even though we have herein shown and described the preferred embodiment of the invention, it is to be understood that the same is susceptible of further changes, modifications and improvements coming within the scope of the appended claims.

Having thus described our invention, what we claim as new is:

1. In a device of the character described, a pair of supporting standards, a shaft rotatably supported between said standards, and a pair of angular box engaging arms connected at one end with said shaft for rotation therewith, means for rotating said shaft, a second pair of arms connected at one end with said shaft for rotation relative thereto, a lid carried by the second named arms for engaging the open side of the box carried by the first named arms, and means for rotating the second named pair of arms in reverse direction relative to the first named pair of arms for moving said lid into operative position to the box during tilting movement of the box.

2. In a device of the character described, a pair of supporting standards, a shaft rotatably supported between said standards, and a pair of angular box engaging arms connected at one end with said shaft for rotation therewith, means for rotating said shaft, a second pair of arms connected at one end with said shaft for rotation relative thereto, a lid carried by the second named arms for engaging the open side of the box carried by the first named arms, and means for rotating the second named pair of arms for moving said lid into operative position to the box during tilting movement of the box, conveyor means for conveying boxes to the first named pair of arms, and additional conveyor means for receiving the contents of a box subsequent to an inverting of said box.

3. In a device of the character described, a pair of supporting standards, a shaft rotatably supported between said standards, and a pair of angular box engaging arms connected at one end with said shaft for rotation therewith, means for rotating said shaft, a second pair of arms connected at one end with said shaft for rotation relative thereto, a lid carried by the second named arms for engaging the open side of the box carried by the first named arms, and means for rotating the second named pair of arms for moving said lid into operative position to the box during tilting movement of the box, conveyor means for conveying boxes to the first named pair of arms, and additional conveyor means for receiving the contents of a box subsequent to an inverting of said box, and means engageable with said lid for tilting the same relative to the second named pair of arms subsequent to the inverting of said box.

4. In a device of the character described, a pair of supporting standards, a shaft rotatably supported between said standards, and a pair of angular box engaging arms connected at one end with said shaft for rotation therewith, means for rotating said shaft, a second pair of arms connected at one end with said shaft for rotation relative thereto, a lid carried by the second named arms for engaging the open side of the box carried by the first named arms, and means for rotating the second named pair of arms for moving said lid into operative position to the box during tilting movement of the box, conveyor means for conveying boxes to the first named pair of arms, and additional conveyor means for receiving the contents of a box subsequent to an inverting of said box, and means engageable with said lid for tilting the same relative to the second named pair of arms subsequent to the inverting of said box, and means for lifting said box from said lid subsequent to the inverting of said box.

5. In a device of the character described, a pair of supporting standards, a shaft rotatably supported between said standards, and a pair of angular box engaging arms connected at one end with said shaft for rotation therewith, means for rotating said shaft, a second pair of arms connected at one end with said shaft for rotation relative thereto, a lid carried by the second named arms for engaging the open side of the box carried by the first named arms, and means for rotating the second named pair of arms for moving said lid into operative position to the box during tilting movement of the box, conveyor means for conveying boxes to the first named pair of arms, and additional conveyor means for receiving the contents of a box subsequent to an inverting of said box, and means engageable with said lid for tilting the same relative to the second named pair of arms subsequent to the inverting of said box, and means for lifting said box from said head subsequent to the inverting of said box, said last named means including a pair of arms pivotally mounted at one end, fingers pivotally mounted intermediate their ends to said arms, means on one end of said fingers for engaging a box, a cross bar connecting said arms, a lever pivoted to said cross bar, links connecting said lever with said fingers, spring means connecting said fingers, and upper and lower stop means engageable with said lever for rocking the same to shift said arms relative to one another against the action of said spring whereby to releasably retain said arms spread apart until said lever is again engaged with one of said trip means.

In testimony whereof we affix our signatures.

CLIFFORD GRIFFITH.
J. GILBERT GRIFFITH.